(12) United States Patent
Green

(10) Patent No.: US 10,950,114 B2
(45) Date of Patent: Mar. 16, 2021

(54) LOCKOUT DEVICE AND SYSTEM

(71) Applicant: Lantern Holdings, LLC, Sterling, VA (US)

(72) Inventor: Chad Thomas Green, Sterling, VA (US)

(73) Assignee: LANTERN HOLDINGS, LLC, Sterling, VA (US)

( * ) Notice: Subject to any disclaimer, the term of this patent is extended or adjusted under 35 U.S.C. 154(b) by 0 days.

(21) Appl. No.: 16/709,640

(22) Filed: Dec. 10, 2019

(65) Prior Publication Data

US 2020/0193794 A1 Jun. 18, 2020

Related U.S. Application Data

(60) Provisional application No. 62/778,695, filed on Dec. 12, 2018.

(51) Int. Cl.

| | |
|---|---|
| *F16P 3/08* | (2006.01) |
| *G08B 21/18* | (2006.01) |
| *G08B 21/02* | (2006.01) |
| *G08B 25/10* | (2006.01) |
| *G08B 7/06* | (2006.01) |
| *B60Q 1/52* | (2006.01) |
| *B60Q 5/00* | (2006.01) |
| *B60Q 9/00* | (2006.01) |
| *B60R 1/00* | (2006.01) |
| *B60R 21/013* | (2006.01) |
| *E02F 9/26* | (2006.01) |
| *F16P 3/00* | (2006.01) |
| *F16P 3/12* | (2006.01) |

(52) U.S. Cl.
CPC ........... *G08B 21/18* (2013.01); *B60Q 1/52* (2013.01); *B60Q 5/005* (2013.01); *B60Q 9/00* (2013.01); *B60R 1/00* (2013.01); *B60R 21/013* (2013.01); *E02F 9/267* (2013.01); *F16P 3/00* (2013.01); *F16P 3/001* (2013.01); *F16P 3/08* (2013.01); *F16P 3/12* (2013.01); *G08B 7/06* (2013.01); *G08B 21/02* (2013.01); *G08B 25/10* (2013.01); *B60R 2300/105* (2013.01); *B60R 2300/20* (2013.01); *B60R 2300/80* (2013.01)

(58) Field of Classification Search
CPC ...... F16P 3/00; F16P 3/001; F16P 3/08; F16P 3/12; F16P 5/00
See application file for complete search history.

(56) References Cited

U.S. PATENT DOCUMENTS

| | | | |
|---|---|---|---|
| 8,602,199 B1 * | 12/2013 | Palombi | G07F 5/18 194/205 |
| 10,460,544 B2 * | 10/2019 | Retzlaff | F16P 3/08 |
| 2014/0028443 A1 * | 1/2014 | Ebner | E05B 67/00 340/10.1 |

* cited by examiner

*Primary Examiner* — Benyam Haile
(74) *Attorney, Agent, or Firm* — Birch, Stewart, Kolasch & Birch, LLP

(57) ABSTRACT

A lockout device that can be used independently and/or through a connected system that provides information and warnings of conventional lockout tag, while also able to actively provide information to a user and any other individual or device through a network in the system. The lockout device is paired with a user and enables audible and/or visual warnings to ensure notice of the lockout device as well as warnings to the user through the network of possible tampering.

20 Claims, 3 Drawing Sheets

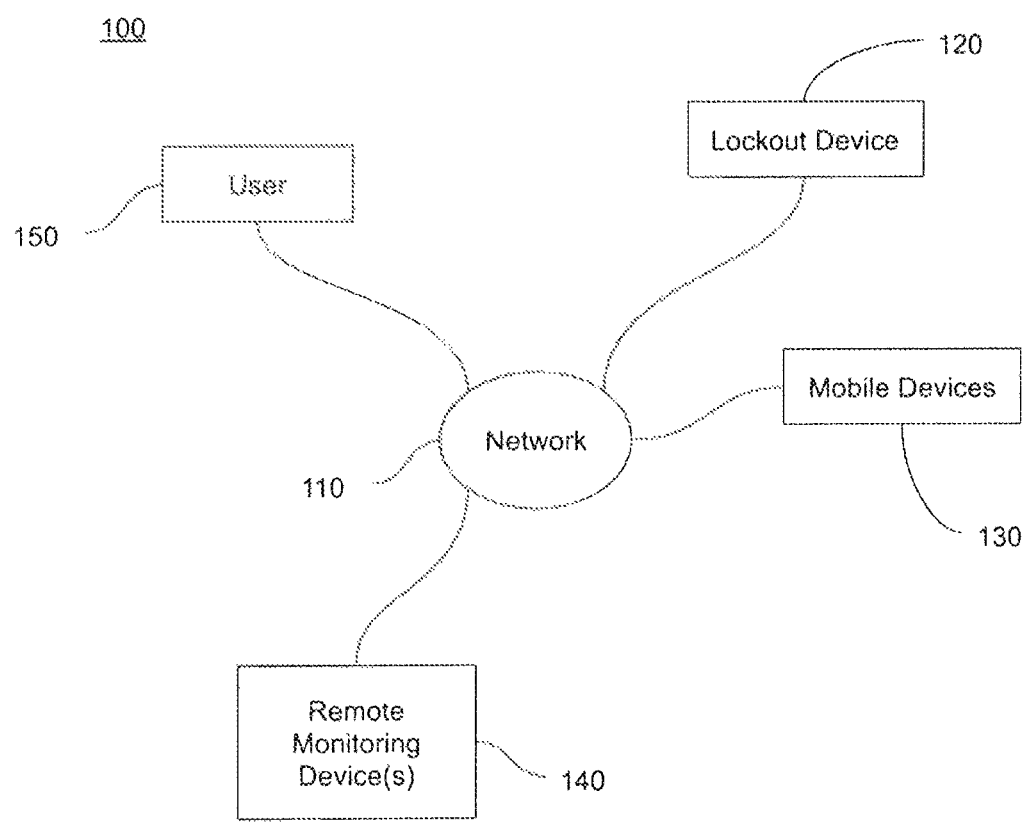

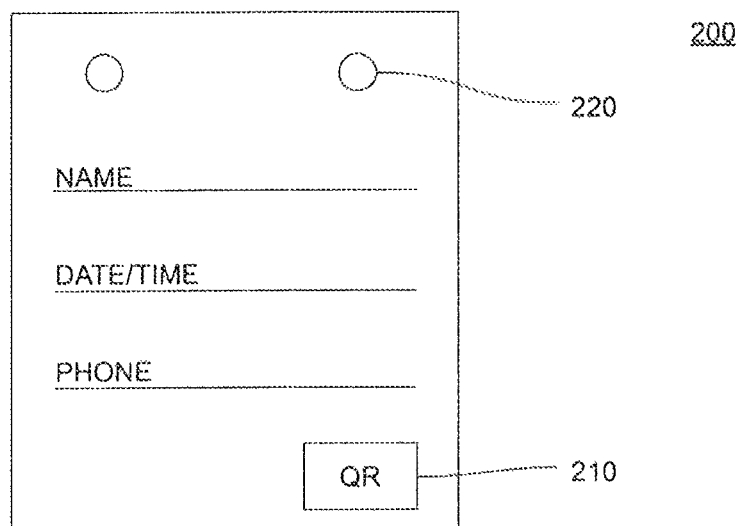
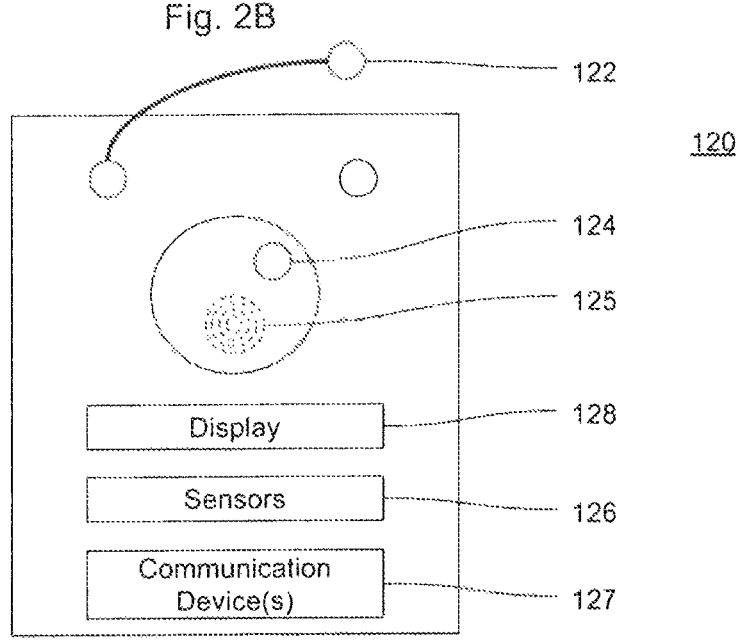

LOCKOUT DEVICE AND SYSTEM

CROSS-REFERENCE TO RELATED APPLICATIONS

This application claims the benefit under 35 U.S.C. § 119(e) of the filing date of U.S. Patent Application No. 62/778,695, for Safety Systems And Methods, which was filed on Dec. 12, 2018, and which is incorporated here by reference.

BACKGROUND

Embodiments of the present invention relate to lockout and tagout safety systems for electrical and mechanical equipment.

When working on a dangerous equipment, a best practice is to lockout power or mechanical motion to that equipment and place a lockout tag on the equipment. This prevents another user from energizing or enabling the machine while repair personnel may be in, on, or about the equipment. Most often, when an accident occurs, it is due to the lockout tag missing (fallen off) or being ignored. Since lockout tags are sometimes left in place for days or weeks, it is common for operators or workers to become desensitized to their significance and ignored.

Conventional lockout devices may include keyed locks, hasps or tags which are tied to the equipment by cable ties. Conventional lockout systems are required to provide the name of the user and the date the lockout tag was placed. Additional information may be provided, such as a picture of the user and a telephone number or comments by the user. The conventional lockout tag is attached to the equipment and includes a warning label and vibrant visible markings. However, such conventional lockout devices only provide static information as it is written on the lockout tag. This information may not be reliably up to date or legible. Also, the conventional lockout tag is not able to communicate with a user and/or other monitoring individuals and/or devices to provide the status of the lockout device. Further, the conventional lockout device is unable to provide an immediate alarm to any individual in proximity to the lockout device upon tampering or unauthorized removal.

SUMMARY

Embodiments of the present invention provide a lockout device that can be used independently and/or through a connected system to address the deficiencies of conventional lockout tags and systems. The embodiments of the present invention include an active lockout device that includes all the information and warnings of the conventional lockout tag, but also is able to actively provide status and additional information to a user and any other individual or device. Further, the lockout device can provide more detailed information to an individual that engages with the lockout device and also enable audible and/or visual warnings to ensure notice of the lockout device.

Embodiments of the present invention may be paired with one or more mobile devices. The lockout system may also include an application on a mobile device such as a mobile phone and/or a remote computing device that provides further relevant information pertaining to the lockout device and it's user(s). Embodiments of the present invention enable notifications to be sent to a user of the lockout device when various events occur, such as when the lockout device is tampered with or if the user leaves a designated area forgetting to remove the device. Further, the lockout device may provide notifications and information to another who is remotely monitoring one or more lockout devices and to anyone who comes in contact with the lockout device when it is affixed with equipment.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is a diagram illustrating an exemplary embodiment of a lockout system

FIG. 2A and FIG. 2B are diagrams illustrating an exemplary embodiment of the lockout device

DETAILED DESCRIPTION

Figure 3:
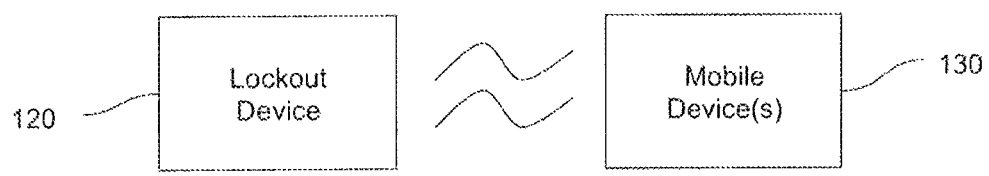
FIG. 3 is a diagram illustrating an exemplary lockout device and mobile device

As detailed in FIG. 1, an embodiment of the present invention includes a lockout system 100. The lockout system may include a lockout device 120, one or more mobile devices 130, one or more remote monitoring devices 140 and one or more users 150 all connected to a network 110, e.g., internet enabling communication between all devices and users 150 on the network.

In embodiments of the invention, a user 150 utilizes an active lockout device 120 and lockout tag 200 as shown in FIG. 2A & FIG. 2B. The lockout device 120 may include an active breakwire 122 that may be fixed or releasably fixed to the lockout device at one end and releasably fixed at the other end. Thus, one end is able to be locked and unlocked to affix to any machine. The lockout device 120 may also include one or more notification lights 124 and sounding device(s) 125, e.g., speaker. The breakwire 122 is able to attach to the lockout tag 200, for example, via one or more holes 220 that are provided in the tag 200. Once the lockout tag 200 is attached to the lockout device 120 via the breakwire 122, the breakwire 122 is used to attach both the lockout tag 200 and the lockout device 120 to the machine. The breakwire 122 is then locked into the lockout device 120 such that the lockout device 120 and lockout tag 200 are secured to the machine. Thus, the lockout tag 200 and lockout device 120 is visible to any individual in proximity of the machine.

The lockout device 120 may include one or more sensors 126 located internally or externally which monitor the status of the lockout device 120. These sensors 126 may include one or more of a gyroscope, accelerometers, temperature and pressure sensor(s). The lockout device 120 may also include one or more communication device 127 that may include one or more of wireless radios such as Bluetooth, Wifi, Cellular modem, RFID, GPS, UWB range-finder and radio (e.g., 900 MHz). This allows communication between the lockout device 120 and one or more devices connected through the network 110.

In the lockout system 100, a user 150 can pair a mobile device 130, such as the user's 150 mobile phone, with a lockout device 120 as illustrated in FIG. 3. The lockout device 120 may be paired with one or more mobile devices 130. This pairing can be accomplished via Bluetooth, RFID, scanning of a QR code, or any other conventional pairing methods. Once the pairing is completed, the user 150, in a preferred embodiment, is the only person who can control locking, unlocking, or modifying any attributes of the lockout device 120. However, this ability may be provided to authorized individuals in other embodiments of the present invention. The pairing can be accomplished by using a digital key. The user 150 may share the digital key with others, if needed, to enable the others to unlock the lockout device 120. The lockout device 120 is in contact with the user 150 via the user's 150 mobile device 130 via the network 110 and can provide the user 150 with an updated status of the lockout device 120, for example, whether the lockout device 120 has been disturbed, moved in any way, or if any alarms on the lockout device 120 have been triggered. This can be displayed to the user 150 via notifications in an application on the mobile device or a direct alert, such as a sound, vibration and/or visual notification on the mobile device.

While the lockout device 120 is engaged in a machine, it can also be monitored by a remote monitoring device 140, such as a standard computer that can be monitored by the user 150 and/or other individuals such as managers or supervisors. The remote monitoring device 140 may monitor one or more lockout devices 120 that are employed on the network allowing for full management and understanding of the status of all active lockout devices 120 in use.

When in use, the lockout device 120 is capable of detecting any tampering with the lockout device 120 such as tilting, shaking, or banging. The sensors 126 detect a disturbance, tampering, and/or environmental concerns that affect the lockout device 120 and provide an alarm to the user 150, remote monitoring device(s) 140, and also an alarm on the lockout device 120 itself by using one or more of the light(s) 124, sound(s) 125 and display 128. Further, the lockout device 120 is able to identify when the breakwire 122 is severed and/or disconnected, notifying the user 150 and/or any other remote monitoring devices 140, while also sounding an alarm on the lockout device 120.

In another embodiment of the present invention an application can be downloaded to any mobile device and will provide information pertaining to one or more lockout device(s) 120 to any individual using the application. The application may include a login along with methods to pair a lockout device 120 with the application and user 150 that has logged into the application. The application may show a variety of information pertaining to the lockout device 120 and the user 150 paired to the lockout device 120, including user 150 identification, how to contact the user 150, reasons for lockout of the machine, a timestamp, estimated date and time frame for the lockout of the machine, etc. The information may include anything pertinent to identification of the user 150, manner to contact the user 150, and/or other authorized individuals and may include reasons and a time frame for the lockout. This information may be stored remotely on the network 110 and/or locally on the lockout device 120.

Other features of the application allow for authorized individuals such as managers and/or supervisors to have login rights that allow them to monitor all lockout devices that are connected to their account. Thus, the authorized individuals can determine which machines are locked out, who locked them out, how long they have been locked out, if any lockout devices 120 have issued an alarm, and any other information that is provided to the application.

In embodiments of the invention, if an individual comes across a lockout device 120 that is locked to a machine, the individual may obtain all pertinent information by receiving information on their mobile device from the lockout device via Bluetooth, RFID, Near-field Communication etc., and/or through the application if installed on the individual's mobile device. For example, the individual may, when in close proximity or when touching their mobile device to the lockout device 120, receive an identification code, URL, or other information from the lockout device 120. The identification code may open the application and provide necessary information to the individual pertaining to the lockout device 120. Further, the lockout tag 200 may include an identification marker such as a QR code 210 that may be scanned by an individual, which directs the individual to a site to download the application, and/or provides the relevant information pertaining to the lockout device 120 and user 150.

Other embodiments of the lockout device 120 may include a button and/or display 128 that can be engaged to provide information pertaining to the lockout device 120 and/or user 150. For example, the individual may receive information pertaining to the user 150 via the display 128 or in any other manner described above and quickly find out who the user 150 of the lockout device 120 is, how to contact the user 150, for example to transfer the digital key to unlock the lockout device 120, or obtain information on how much longer the lockout device 120 is intended to be locked to the machine.

The lockout device 120, once paired with a user 150, maintains its pairing until the user 150 unlocks the lockout device 120. In embodiments of the present invention, the application on the user's 150 mobile device may define a geographical area in which the user 150 may be located when paired with a lockout device 120. Should the user 150 travel outside the defined geographical area, the application will send the user 150 a notification and/or other authorized individuals that the user 150 is paired with a lockout device 120. For example, should a user 150 forget about the lockout device 120 and decide to travel home, then the user 150 is notified once outside the defined geographical area of the lockout device's 120 location. The user 150 can then return and unlock the lockout device 120 to avoid unwanted downtime of the machine and confusion by other individuals if anyone is working on the machine.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A lockout system, comprising:
   a lockout device; a lockout tag;
   a mobile device that communicates with the lockout device via a network providing information to a user when the lockout device is locked to a machine by the user;
   the lockout device including:
      an active affixing device to secure the lockout device to the lockout tag and the machine;
      one or more sensors that detect disturbance of the lockout device;
      one or more notifying alarms; and
      a pairing means that pairs the lockout device to the mobile device of the user, such that only the user can control locking, unlocking or modifying any attributes of the lockout device;
   the lockout device providing status information to the user pertaining to the lockout device and providing information to one or more individuals engaged with the lockout device regarding the user and the attributes associated with the lockout device.

2. The lockout system of claim 1, wherein the lockout device provides information to one or more remote monitoring devices connected to the network.

3. The lockout system of claim 1, wherein the status information defines the lockout tag as locked or unlocked.

4. The lockout system of claim 1, wherein the lockout device information includes identification of a user paired with the lockout device, a timestamp indicating when the lockout device was affixed to the machine, estimated time duration of being affixed to the machine and information for reaching the user.

5. The lockout system of claim 1, further including an application within the mobile device that locks the lockout device with a unique digital key.

6. The lockout system of claim 5, wherein the unique digital key may be transferred by the user to an authorized individual allowing the authorized individual to control unlocking of the lockout device.

7. The lockout system of claim 1, wherein the lockout device provides the user with an alert when the lockout device is tampered with or disturbed.

8. The lockout system of claim 1, wherein the status of one or more lockout devices are monitored remotely by authorized individuals.

9. The lockout system of claim 1, wherein an application allows modification of the lockout device's digital properties.

10. The lockout system of claim 9, wherein the application allows the user to communicate with other individuals.

11. The lockout system of claim 10, wherein the communication includes sharing of a unique digital key.

12. The lockout device of claim 1, further comprising an identification marker that may be scanned by said one or more individuals engaged with the lockout device and provide relevant information pertaining to the lockout device and user.

13. A lockout device, comprising:
   an active affixing device to secure the lockout device to a lockout tag and a machine;
   one or more sensors that detect disturbance of the lockout device;
   one or more notifying alarms; and
   a pairing means that pairs the lockout device to a mobile device of a user, when the lockout device is locked to the machine by the user, such that only the user can control locking, unlocking or modifying any attributes of the lockout device; the lockout device providing status information to the user pertaining to the lockout device and providing information to one or more individuals engaged with the lockout device regarding the user and attributes associated with the lockout device.

14. The lockout device of claim 13, wherein the lockout device includes a display that displays information pertaining to the lockout device.

15. The lockout device of claim 13, wherein the lockout device includes one or more of visual and audible alarms that are activated when the lockout device is disturbed.

16. The lockout device of claim 13, wherein one or more sensors may include a gyroscope, an accelerometer, a magnetometer, a temperature sensor, a humidity sensor, a breakwire, and a pressure sensor.

17. The lockout device of claim 13, wherein the active affixing device is a breakwire and triggers an alarm on the lockout device when the breakwire is disconnected.

18. The lockout device of claim 13, further including a communication device that communicates with a mobile device and a network.

19. The lockout device of claim 15, wherein the one or more visual and audible alarms are located on the lockout device.

20. The lockout device of claim 15, further comprising an identification marker that may be scanned by said one or more individuals engaged with the lockout device and provide relevant information pertaining to the lockout device and user.

* * * * *